United States Patent Office 3,657,193
Patented Apr. 18, 1972

3,657,193
POLYESTERS CONTAINING DIALKYL SUBSTI-
TUTED SULFO-CARBOXYLIC ACIDS
John R. Caldwell, Kingsport, Tenn., assignor to Eastman
Kodak Company, Rochester, N.Y.
No Drawing. Filed June 24, 1970, Ser. No. 49,511
Int. Cl. C08g 17/04, 17/08
U.S. Cl. 260—76                                7 Claims

ABSTRACT OF THE DISCLOSURE

A high thermal stability textile fiber produced from a polymer of (A) a dicarboxylic acid component consisting essentially of at least 80 mole percent terephthalic acid, or an esterifiable derivative thereof,
(B) a diol component selected from the group consisting of ethylene glycol, 1,4-butanediol, and 1,4-cyclohexane-dimethanol, and
(C) from about 1–25 mole percent, based on the total moles of dicarboxylic acid component of a high thermal stability dye improving additive, or an esterifiable derivative thereof, corresponding to the structure

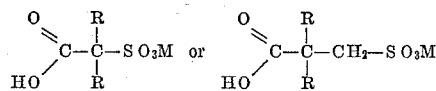

wherein

R is a monovalent alkyl radical having from 1–4 carbon atoms, and
M is an ion of a divalent metal or an alkali metal.

---

This invention broadly relates to high thermal stability textile fibers produced from polymers of terephthalic acid, ethylene glycol, 1,4-butanediol or 1,4-cyclohexanedimethanol and a high thermal stability dye improving additive having two alkyl groups containing 1–4 carbon atoms substituted on the carbon atom in the alpha position with respect to the carboxy group of the component. In one embodiment the dye improving component can be either 2-methyl-2-(sodiosulfo)propionic acid or 2,2-dimethyl-3-(sodiosulfo)propionic acid.

Polyester compositions from which fibers can be produced have assumed tremendous significance in recent years. One problem associated with the expanded use of polyester fibers is their difficulty of dyeing with basic dyes, and numerous materials have been proposed for use as dye improving additives.

Specifically, it is well known to use various moieties which contain the —SO₃H group and metal salts thereof which are polyesterified into the polymer chain. For example, U.S. 3,018,272 to Griffing et al. discloses polyester consisting of a basic dye sensitizing unit which is a metallic salt of a —SO₃H group. Additionally, U.S. 3,123,587 to Hogsed discloses a copolymeric ester-forming compound containing a sulfonated salt group represented by the formula X$_n$RSO₃M, where X is an ester-forming group, n is an integer from 1 to 2, R is an organic radical which may contain substituents that are inert to the polyester reaction mixture, and M is a metal.

While many of these components produce a polyester fiber of desirable dyeability with basic dyes, a significant problem still exists in that although the fiber dyes desirably, many of the dye improving additives tend to degrade at the extreme temperatures encountered in the melt spinning operation and the resulting fiber is undesirably discolored and commercially unmarketable.

Accordingly, it is an object of this invention to provide specific linear condensation polymers suitable for producing a non-discolored textile fiber of improved dyeability with basic dyes, wherein the dye improving additive does not thermally degrade to discolor the fiber at the extreme temperature conditions encountered in melt spinning the fiber. Other objects, advantages, and features of this invention wil be readily apparent to those skilled in the art from the following description and appended claims.

In summary, one aspect of this invention comprises a basic dyeable textile fiber produced from an oriented, crystalline linear condensation polymer of (A) a dicarboxylic acid component consisting essentially of at least 80 mole percent terephthalic acid, or an esterifiable derivative thereof, and up to 20 mole percent of one or more other dicarboxylic acids, or esterifiable derivatives thereof,
(B) a diol component selected from the group consisting of ethylene glycol, 1,4-butanediol, and 1,4-cyclohexane-diamethanol, and
(C) from about 1–25 mole percent, based on the total moles of dicarboxylic acid component, of a high thermal stability dye improving additive, or an esterifiable derivative thereof, corresponding to the molecular structure

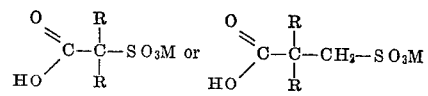

wherein

R is a monovalent alkyl radical having from 1–4 carbon atoms, and
M is an ion of a divalent metal or an alkali metal.

The dicarboxylic acid component used in this invention can comprise at least 80 mole percent terephthalic acid or an esterifiable derivative of terephthalic acid and up to 20 mole percent of one or more other dicarboxylic acids or esterifiable derivatives thereof. An "esterifiable derivative" in this application and appended claims means a derivative wherein the carboxyl hydrogen has been substiuted so as to produce a structure that will esterify with the diol component to form the polymer of this invention. The other dicarboxylic acids, or mixtures thereof, which may be used as any nonterephthalic acid portion of the dicarboxylic acid component include any aliphatic, alicyclic or aromatic acid suitable for use in the linear condensation polymer of this invention. More specifically, dicarboxylic acids, that are particularly useful include saturated aliphatic dicarboxylic acids and may include small amounts of unsaturated aliphatic dicarboxylic acids. Additionally, alicyclic dicarboxylic acids such as 1,4-cyclohexanedicarboxylic acid, and aromatic dicarboxylic acids such as isophthalic and naphthalenic dicarboxylic acids can be used. Esterifiable derivatives of terephthalic acid and the other dicarboxylic acids that are useful in this invention include, among other derivatives, dialkyl esters. Dialkyl esters are especially desirable because of the ease of ester interchanging a dialkyl ester with a diol component so as to ultimately produce the polymer and thereafter the shaped article of this invention.

The diol component used in this invention can comprise ethylene glycol, 1,4-butanediol or 1,4-cyclohexane-dimethanol. When 1,4-cyclohexanedimethanol is used, a spinning aid, such as chlorinated diphenyl, can be used to lower the temperature of melt spinning.

In one further specific embodiment a polymer is prepared of dimethyl terephthalate, 2-hydroxyethyl ester of 2,2-dimethyl-3-(sodiosulfo)propionic acid, 1,4-cyclohexanedimethanol, trimethylolpropane, and magnesium titanium butoxide. From 10 to 15 weight percent chlorinated diphenyl (54 weight percent chlorine) can be added as a spinning aid.

In one additional embodiment a copolymer is prepared of 0.80 mole terephthalic acid, 0.03 mole 2-methyl-2-(sodiosulfo)propionic acid, 0.17 mole isophthalic acid and 1.0 mole 1,4-cyclohexanedimethanol. About 0.01 mole trimesic acid is added as a branching agent.

The high thermal stability dye improving additive useful in this invention has the molecular structure:

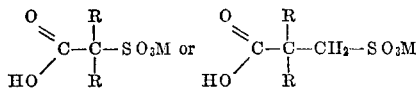

wherein

R is a monovalent alkyl radical having 1–4 carbon atoms, and

M is an ion of a divalent metal or alkali metal.

Specific classes of esterifiable derivatives useful with this invention include substituted and unsubstituted lower alkyl (1 to 4 carbons) esters and phenyl esters. In one embodiment a substituted ethyl ester is particularly desirable for use in this invention because of the ease of reacting the dye improving additive with ethylene glycol to form the ester. In one specific embodiment of this invention, the 2-hydroxyethyl ester or the 4-hydroxybutyl ester can be used.

The ion of a divalent metal or an alkali metal shown in the structure of the high thermal stability dye improving additive of this invention can comprise any divalent metal ion, such as lead or calcium, or alkali metal ion, such as lithium, sodium, or potassium that will bond to the sulfonate group of the additive and otherwise function according to this invention. Alkali metals are particularly useful in this invention, and in one embodiment sodium can be used.

In one specific embodiment a copolymer is prepared from 0.80 mole terephthalic acid, 0.17 mole isophthalic acid, 0.03 mole 2-methyl-2-ethyl-3-(potassiosulfo)propionic acid and 1.0 mole 1,4-cyclohexanedimethanol.

In another specific embodiment a copolymer is prepared from 0.97 mole terephthalic acid, 0.03 mole 2,2-dimethyl-3-(lithiosulfo)propionic acid, and 0.1 mole polyethylene glycol of about 1000 molecular weight and 0.9 mole ethylene glycol.

The high thermal stability dye improving additive of this invention is prepared by methods well known in the art. One method involves preparation of the sulfonic acid corresponding to the sulfonic acid salt, which comprises the additive of this invention, and the subsequent neutralization of the acid form to the salt form.

One of the several methods of producing the aliphatic sulfonic acid used to produce the sulfonic acid salt is disclosed in U.S. 3,393,213. According to a typical embodiment of the method disclosed in U.S. 3,393,213, isobutyric anhydride can be reacted with sulfuric acid to produce 2-methyl-2-(sodiosulfo)propionic acid. Other methods of preparing the dye improving additive can be used, such as those described in Weil, Organic Syntheses, 36, 83–6 (1956), Stirton, J. Am. Oil Chem. Soc., 31, 579 (1954) or U.S. Pat. No. 2,822,387. These publications and patents are incorporated herein by reference.

After the aliphatic sulfonic acid structure is produced, the desired dye improving additive can be obtained, according to methods well known in the art, by neutralization of the sulfonic acid group with the appropriate metal hydroxide, oxide, carbonate, and the like.

The esterifiable derivatives of the high thermal stability dye improving additive useful in this invention can be formed by methods well known in the art. A typical method includes heating a solution of the additive with excess diol until esterification has been accomplished. Typically in this method the ester remains in solution in the excess diol. The ester can then be used in this solution or it can be isolated by evaporation of the glycol in vacuum.

According to this invention the high thermal stability dye improving additive can comprise from about 1–25 mole percent, based on the total moles of dicarboxylic acid component, and in one embodiment can comprise from about 1–10 mole percent, and in one specific embodiment can comprise from about 1.5–3 mole percent.

According to this invention both the dicarboxylic acid component and the high thermal stability dye improving additive are polyesterified with the diol component to produce the linear condensation polymer of this invention. Accordingly, the high thermal stability dye improving additive can be added either at the beginning of the polyesterification reaction or at any subsequent time that will produce a linear condensation polymer according to the practice of this invention. Preferably the additive is added at any time before the dicarboxylic acid component and diol component react to form polymer units with a molecular weight of greater than about 10,000. More preferably, the additive and dicarboxylic acid component can be contacted with the diol component at substantially the same time, such as by combining the dicarboxylic acid component and additive and then contacting the diol component with the combined additive and dicarboxylic acid components.

In some cases, it may be desirable to prepare a polymer masterbatch that contains, for example, from about 10–25 mole percent of the dye improving additive, based on the total moles dicarboxylic acid component. This master batch can then be mixed before extrusion with the polymerized dicarboxylic acid component and diol component of this invention, so as to produce a polymer containing the desired quantity of high thermal stability dye improving additive.

The high thermal stability dye improving additive of this invention functions as a chain terminator and in some instances can limit the molecular weight of the polyester. In order to compensate for this effect, it is often desirable to employ a carboxyl or hydroxyl containing organic branching agent that contains three or more carboxyl groups, hydroxyl groups or a combination thereof. Examples of suitable hydroxyl-containing branching agents include glycerine, trimethylolpropane, pentaerythritol and 1,2,5-trihydroxypentane. Examples of suitable carboxyl containing branching agents include trimesic, trimellitic and pyromellitic acid. The branching agent can, depending upon a number of factors such as the amount of terminator present, the amount of branching desired, and the like, comprise, based on the total mols of dicarboxylic component, from about 0.1–3 mole percent.

Although a branching agent can be used in this invention, the ratio of hydroxy groups to carboxyl groups in the overall polymer components is substantially unity in the linear condensation polymer of this invention.

Shaped articles, including fibers, produced from the polymers of this invention can be readily dyed to deep shades with the usual types of basic dyes according to methods well known in the art. The dyed fibers have excellent fastness to light, laundering, and drycleaning. Basic dyes that can be used to color the shaped articles include Sevron Blue B (C.I. No. Basic Blue 21), Sevron Brilliant Red 4G (C.I. No. Basic Red 14), Sevron Green B. (C.I. No. Basic Green 3), Sevron Yellow L (C.I. No. Yellow 13). Numerous other basic dyes known to the man skilled in the art can be used.

According to procedures well known in the art, the fibers of this invention can be dyed with the aid of carriers or swelling agents that promote penetration of the dye into the fiber structure. The fibers of this invention can be melt spun, drafted and heat-set according to procedures well known in the art.

The data set forth below is used to determine the thermal stability characteristics of various dye improving lower aliphatic structures containing a sodium sulfonate group and an esterified carboxyl group. Of specific interest are aliphatic structures wherein the sodium sulfonate and esterified carboxyl groups are separated by one or two carbon atoms.

In this investigation, attention is focused on the thermal stability of linear condensation polymers containing these various dye improving structures, together with terephthalic acid and ethylene glycol or 1,4-butanediol. All polymers are made according to the practice of this invention except for the substitution of various sulfonated structures.

EXAMPLE 1

Alpha carbon atom unsubstituted

In a first example, six runs are conducted to investigate the thermal stability characteristics of linear condensation polymers containing dye improving additives wherein the alpha carbon atom of the sulfonated aliphatic structure is unsubstituted.

Specifically, the structures containing an unsubstituted alpha carbon atom used in this example are sodiosulfoacetic acid having the formula:

$$HOOC-CH_2-SO_3Na$$

and 3-(sodiosulfo)propionic acid having the formula:

$$HOOC-CH_2-CH_2-SO_3Na$$

Each of these structures are used to form a linear condensation polymer with terephthalic acid and ethylene glycol, terephthalic acid and 1,4-butanediol and terephthalic acid and 1,4-cyclohexanedimethanol.

In order to prepare the polymer of sodiosulfoacetic acid, terephthalic acid and ethylene glycol, a portion of sodiosulfoacetic acid is heated with excess ethylene glycol at a temperature of 150–180° C. for several hours to give the 2-hydroxyethyl ester of sodiosulfoacetic acid which has the formula:

$$HOC_2H_4O-CO-CH_2-SO_3Na$$

This ester is used to prepare the desired polymer containing 2 mole percent sodiosulfoacetic acid.

The following materials are placed in a 500 ml. flask.

| | G. |
|---|---|
| Dimethyl terephthalate | 133.0 |
| 2-hydroxyethyl ester of sodiosulfoacetic acid | 2.8 |
| Ethylene glycol | 87.0 |
| Trimethylol propane | 0.37 |
| Zinc acetate | 0.06 |
| Antimony acetate | 0.063 |

The mixture is stirred in an atmosphere of nitrogen at 180–190° C. until the evolution of methyl alcohol has practically stopped, indicating ester interchange is complete. The temperature is then raised to 275° C. and held for 10 minutes whereupon a vacuum is applied. Stirring under the vacuum at 275° C. is continued for 45 minutes. The I.V. of the polymer is 0.88 and the polymer contains some color indicating that some degradation of the sodiosulfoacetic acid occurred even as the polymer is built up.

A polymer of terephthalic acid, ethylene glycol and 2 mole percent 3-(sodiosulfo)propionic acid is prepared in a similar manner as described above and a discolored polymer is also obtained.

In order to prepare the polymer of sodiosulfoacetic acid, terephthalic acid, and 1,4-butanediol, the 2-hydroxy-ethyl ester of sodiosulfoacetic acid is prepared according to the above described procedure. This ester is then used to prepare the desired polymer containing 2 mole percent sodiosulfoacetic acid.

The following materials are placed in a 500 ml. flask.

| | G. |
|---|---|
| Dimethyl terephthalate | 133.0 |
| 2-hydroxyethyl ester of sodiosulfoacetic acid | 2.89 |
| 1,4-butanediol | 126.0 |
| Mg[HTi(OC$_3$H$_5$)$_6$]$_2$ catalyst | 0.01 |

The mixture is stirred in an atmosphere of nitrogen at 185–200° C. until ester interchange is complete. The temperature is then raised to 245° C. and held for 10 minutes whereupon a vacuum is applied. Stirring under the vacuum at 245° C. is continued for 60 minutes. The polymer is observed to be dark, indicating that some degradation of the sodiosulfoacetic acid occurred even as the polymer is built up, and has an inherent viscosity of about 0.66.

A polymer of terephthalic acid, 1,4-butanediol and 3-(sodiosulfo)propionic acid is prepared in a similar manner as described above. This polymer has a grayish color after polymer build up.

In order to prepare the polymer of sodiosulfoacetic acid, terephthalic acid and 1,4-cyclohexanedimethanol, a portion of sodiosulfoacetic acid is heated with excess ethylene glycol at a temperature of 150–180° C. for several hours to give the 2-hydroxyethyl ester of sodiosulfoacetic acid which has the formula:

$$HOC_2H_4O-CO-CH_2-SO_3Na$$

This ester is used to prepare the desired polymer containing 2 mole percent sodiosulfoacetic acid.

The following materials are placed in a 500 ml. flask.

| | G. |
|---|---|
| Dimethyl terephthalate | 97.00 |
| 2-hydroxyethyl ester of sodiosulfoacetic acid | 2.48 |
| Ethylene glycol | 94.00 |
| Trimethylol propane | 0.34 |
| Magnesium titanium butoxide catalyst | 0.026 |

The mixture is stirred in an atmosphere of nitrogen at 180–200° C. until the evolution of methyl alcohol has practically stopped, indicating ester interchange is complete. The temperature is then raised to 270° C. and a vacuum is applied. Stirring under the vacuum at 270° C. is continued for 5 minutes to form a polymer with an inherent viscosity of 0.31. The polymer is comminuted and heated under a vacuum at 230–270° C. for 6 hours to produce a polymer with an inherent viscosity of 0.65. The polymer contains some color indicating that some degradation of the sodiosulfoacetic acid occurred even as the polymer is built up.

A polymer of terephthalic acid, 1,4-cyclohexanedimethanol and 2 mole percent 3-(sodiosulfo)propionic acid is prepared in a similar manner as described above and a discolored polymer is also obtained.

The polymers of each of these two unsubstituted structures with terephthalic acid and 1,4-butanediol are then used to melt spin a fiber according to techniques well known in the art. A draw ratio of 4.8 and a draw tension of 1.06 g./denier are used. At the temperature of melt spinning, about 255° C., it is observed that polymer melt discolors badly, indicating that the unsubstituted structures have thermally degraded. Although these fibers dye readily with basic dyes, the fibers produced from this polymer are undesirably discolored and the dyed fiber commercially unmarketable. When the polymers of each of the unsubstituted structures with terephthalic acid and ethylene glycol are subjected to the same investigation, similar results are observed since the melt spinning temperature of this polymer is about 275° C. and any thermal degradation that would occur at 255° C. would also occur at the higher temperature of 275° C. Similar results are observed when polymers of each of the unsubstituted structures with terephthalic acid and 1,4-cyclohexanedimethanol are melt spun.

These data indicate that the unsubstituted structures are unsatisfactory because degradation of the structure during polymer build up and degradation during melt spinning results in a discolored commercially unmarketable fiber.

EXAMPLE 2

One alkyl group substituted on alpha carbon atom

In a second example, six additional runs are conducted to investigate the thermal stability of linear condensation polymers containing dye improving additives wherein one methyl group is substituted on the alpha carbon atom. Specifically, the structures containing one methyl group substituted on the alpha carbon atom are 2-(sodiosulfo)propionic acid having the formula:

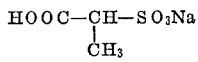

and 2-methyl-3-(sodiosulfo)propionic acid having the formula:

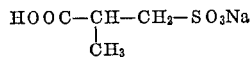

According to the procedure in the first example, each of these structures are used to form a polymer with terephthalic acid and ethylene glycol, terephthalic acid and 1,4-butanediol and terephthalic acid and 1,4-cyclohexanedimethanol.

During the build up phase, each of these polymers becomes partially discolored indicating that some degradation of the 2-(sodiosulfo)propionic acid and 2-methyl-3-(sodiosulfo)propionic acid occurred even during polymer build up.

As in the first example, polymers prepared from each of these one methyl group substituted aliphatic structures, terephthalic acid and 1,4-butanediol are melt spun into fibers. As in the first example using unsubstituted structures, the polymer containing one methyl group substituted on the alpha carbon atom discolored badly during melt spinning and a discolored, commercially unmarketable fiber was produced. Polymers prepared from each of these one methyl group substituted structures with terephthalic acid and ethylene glycol or terephthalic acid and 1,4-cyclohexanedimethanol also discolored during melt spinning as expected due to the higher melt spinning temperatures. Dyed fibers of these polymers are discolored and commercially unmarketable.

The results of this second example indicate that the structures substituted with one methyl group on the alpha-carbon atom are also unsatisfactory as dye improving additives due to thermal degradation. It is believed that when the structures are substituted with one ethyl, propyl or butyl group on the alpha-carbon atom, instead of one methyl group, similar results would be achieved.

EXAMPLE 3

Two alkyl groups substituted on alpha carbon atom

In a third example to demonstrate the surprising thermal stability of the additives of this invention, polymers of structures are used wherein the alpha carbon atom is substituted with two methyl groups. Specific structures used in this example which contain, according to this invention, two methyl groups substituted on the alpha carbon atom are 2-(methyl)-2-(sodiosulfo)propionic acid having the formula

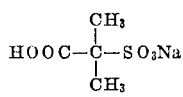

and 2,2-dimethyl-3-(sodiosulfo)propionic acid having the formula:

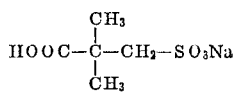

According to the procedure of Example 1, polymers are prepared containing terephthalic acid, ethylene glycol, and 2 mole percent, based on the total moles of terephthalic acid, of each of the above dimethyl substituted structures.

Additionally, according to the procedure of Example 1, polymers are prepared containing terephthalic acid, 1,4-butanediol and 2 mole percent, based on the total moles of terephthalic acid, of each of the above dimethyl substituted structures.

Also according to the procedure of Example 1 polymers are prepared containing terephthalic acid, 1,4-cyclohexanedimethanol and about 2 mole percent, based on the total moles of terephthalic acid, of each of the above dimethyl substituted structures.

No discoloration of any of the above polymers is noted during polymer build up.

These polymers are melt spun into fibers as in the first two examples. During melt spinning of the terephthalic acid and 1,4-butanediol containing polymer at about 255° C., no discoloration is observed and the fiber is entirely free of undesirable discoloration. During melt spinning of the terephthalic acid and ethylene glycol polymer at about 275° C., no discoloration is noted and the fiber is entirely free of undesirable discoloration. During melt spinning of the terephthalic acid and 1,4-cyclohexanedimethanol polymer no discoloration is noted and the fiber is entirely free of undesirable discoloration.

Fibers from all six polymers prepared with additives wherein the alpha carbon is substituted with two methyl groups dyed to deep shades with a basic dye.

It is believed that when an ethyl, propyl or butyl group is used in place of one or more of the methyl groups in these structures similar results would be achieved.

Thus, applicant has demonstrated the surprising thermal stability of the additives of this invention, wherein the alpha-carbon atom is substituted with two methyl groups, as opposed to structures wherein the alpha-carbon atom is unsubstituted or substituted with one alkyl group. It is believed that when the structures are substituted on the alpha-carbon atom with two alkyl groups which can be either methyl, ethyl, propyl or butyl similar results would be achieved.

The invention has been described in detail with particular reference to preferred embodiments thereof, but it will be understood that variations and modifications can be effected within the spirit and scope of the invention.

I claim:

1. A textile fiber of an oriented, crystalline polyester of
   (A) a dicarboxylic acid component consisting essentially of at least 80 mole percent terephthalic acid, or an esterifiable derivative thereof, and up to 20 mole percent of one or more other dicarboxylic acids or esterifiable derivatives thereof,
   (B) a diol component selected from the group consisting of ethylene glycol, 1,4-butanediol and 1,4-cyclohexanedimethanol, and
   (C) from about 1–25 mole percent, based on the total moles of dicarboxylic acid component, of a high thermal stability dye improving additive, or an esterifiable derivative thereof, corresponding to the molecular structure

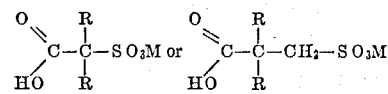

wherein
      R is a monovalent alkyl radical having 1–4 carbon atoms, and
      M is an ion of an alkali metal.

2. The fiber of claim 1 wherein the alkali metal is sodium.

3. The fiber of claim 1 further containing
   (D) based on the moles of (A), from about 0.1 to about 3 mole percent, of an organic branching agent containing three or more hydroxyl groups or carboxyl groups or a combination thereof, polymer components (A), (B), (C), and (D) having a ratio of hydroxy to carboxyl groups which is substantially unity.

4. The fiber of claim 1 produced from polymer of
   (A) an esterifiable derivative of terephthalic acid,
   (B) ethylene glycol, and
   (C) from 1–10 mole percent, based on the moles of terephthalic acid, of a dye improving additive selected from the group consisting of a substituted lower alkyl ester of 2-methyl-2-(sodiosulfo)propionic acid, and a substituted lower alkyl ester of 2,2-dimethyl-3-(sodiosulfo)propionic acid.

5. The fiber of claim 1 produced from a polymer of
   (A) an esterifiable derivative of terephthalic acid,
   (B) 1,4-butanediol, and
   (C) from 1–10 mole precent, based on the moles of terephthalic acid, of a dye improving additive selected from the group consisting of a substituted lower alkyl ester of 2-methyl-2-(sodiosulfo)propionic acid, and a substituted lower alkyl ester of 2,2-dimethyl-3-(sodiosulfo)propionic acid.

6. The fiber of claim 1 produced from a polymer of
   (A) an esterifiable derivative of terephthalic acid,
   (B) 1,4-cyclohexanedimethanol, and
   (C) from 1–10 mole percent, based on the moles of terephthalic acid, of a dye improving additive selected from the group consisting of a substituted lower alkyl ester of 2-methyl-2-(sodiosulfo)propionic acid, and a substituted lower alkyl ester of 2,2-dimethyl-3-(sodiosulfo)propionic acid.

7. A textile fiber of an oriented, crystalline polyester of
   (A) terephthalic acid,
   (B) ethylene glycol, and
   (C) from 1–10 mole percent based on the total moles of terephthalic acid, of 2,2-dimethyl-3-(sodiosulfo)propionic acid.

References Cited
UNITED STATES PATENTS

| | | | |
|---|---|---|---|
| 3,018,272 | 1/1962 | Griffing et al. | 260—75 S |
| 3,033,824 | 5/1962 | Huffman | 260—75 S |
| 3,169,944 | 2/1965 | Scott et al. | 260—75 S |

MELVIN GOLDSTEIN, Primary Examiner

U.S. Cl. X.R.

260—75 S